United States Patent
Armstrong et al.

(10) Patent No.: US 10,593,224 B2
(45) Date of Patent: Mar. 17, 2020

(54) TACTICAL ENGAGEMENT SIMULATION (TES) GROUND-BASED AIR DEFENSE PLATFORM

(71) Applicant: Cubic Corporation, San Diego, CA (US)

(72) Inventors: Martyn Armstrong, Durrington (GB); Neale Smiles, Durrington (GB); Matt Covil, Winterbourne Dauntsey (GB); Benedict Simon McNiff, Amesbury (GB)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 16/407,390

(22) Filed: May 9, 2019

(65) Prior Publication Data

US 2019/0347950 A1  Nov. 14, 2019

Related U.S. Application Data

(60) Provisional application No. 62/670,713, filed on May 11, 2018.

(51) Int. Cl.
  *G09B 9/00* (2006.01)
  *B64C 39/02* (2006.01)
  (Continued)

(52) U.S. Cl.
  CPC ............ *G09B 9/003* (2013.01); *B64C 39/024* (2013.01); *G01S 19/47* (2013.01); *G05D 1/0022* (2013.01);
  (Continued)

(58) Field of Classification Search
  CPC .... G09B 9/003; G05D 1/0022; G05D 1/0094; G05D 1/101; G01S 19/47; B64C 2201/145; B64C 2201/12
  (Continued)

(56) References Cited

U.S. PATENT DOCUMENTS

| 6,386,879 B1 * | 5/2002 | Varshneya | F41G 3/265 434/16 |
| 2007/0009859 A1 * | 1/2007 | Preston | F41A 33/00 434/11 |

(Continued)

OTHER PUBLICATIONS

Inter-Coastal Electronics, Inc. (ICE), Aviation Training Systems, copyrighted 2018-2019, retrieved online on Jul. 26, 2019 from https://inter-coastal.com/ice_aviation.html, 10 pages.
(Continued)

*Primary Examiner* — Claude J Brown
(74) *Attorney, Agent, or Firm* — Kilpatrick Townsend & Stockton, LLP

(57) ABSTRACT

An aerial vehicle is described that is capable of interacting within a TES environment, and capable of acting as a Ground Based Air Defense (GBAD) platform to represent virtually any type of aircraft in the simulation. The aerial vehicle may include sensors for determining its own location and/or orientation, and may further carry a payload of components that can be assembled modularly to equipped the aerial vehicle with different types of functionality. Such functionality can include enabling the aerial vehicle to gather information regarding its surroundings, engage with other military entities within the TES environment, and/or enable other military entities within the TES environment to engage with it.

20 Claims, 4 Drawing Sheets

(51) Int. Cl.
  *G01S 19/47* (2010.01)
  *G05D 1/00* (2006.01)
  *G05D 1/10* (2006.01)
(52) U.S. Cl.
  CPC .......... *G05D 1/0094* (2013.01); *G05D 1/101* (2013.01); *B64C 2201/12* (2013.01); *B64C 2201/145* (2013.01)
(58) Field of Classification Search
  USPC ....................................................... 244/110 E
  See application file for complete search history.

(56) References Cited

U.S. PATENT DOCUMENTS

| | | |
|---|---|---|
| 2010/0034424 A1 | 2/2010 | Goossen |
| 2012/0019522 A1 | 1/2012 | Lawrence et al. |
| 2013/0323687 A1* | 12/2013 | Wenger ................... G09B 9/02 434/29 |
| 2015/0257080 A1* | 9/2015 | Rostagno ............... G09B 9/003 370/316 |
| 2017/0021946 A1* | 1/2017 | Weller .................... G06F 11/00 |
| 2017/0191799 A1* | 7/2017 | Pietz ..................... F41G 3/2622 |
| 2018/0094902 A1 | 4/2018 | McNeil et al. |
| 2018/0095433 A1* | 4/2018 | Rico ....................... B64C 39/024 |
| 2019/0055018 A1* | 2/2019 | Bei ........................ B64C 39/024 |
| 2019/0068962 A1* | 2/2019 | Van Schoyck ........ G01C 21/20 |
| 2019/0082113 A1* | 3/2019 | Yu .................... H04N 5/232121 |
| 2019/0144115 A1* | 5/2019 | Chen .................... B64C 25/32 |

OTHER PUBLICATIONS

International Search Report and Written Opinion dated Jul. 15, 2019 in International Patent Application No. PCT/US2019/031436, all pages.

* cited by examiner

TACTICAL ENGAGEMENT SIMULATION (TES) GROUND-BASED AIR DEFENSE PLATFORM

CROSS-REFERENCES TO RELATED APPLICATIONS

This application claims the benefit of U.S. Provisional Patent Application No. 62/670,713, filed May 11, 2018, entitled "Tactical Engagement Simulation (TES) Ground-Based Air Defense Target," which is assigned to the assignee hereof and incorporated by reference herein in its entirety.

BACKGROUND

Embodiments of the invention(s) described herein are generally related to tactical engagement simulation (TES) for military training. That said, a person of ordinary skill in the art will understand that alternative embodiments may vary from the embodiments discussed herein, and alternative applications may exist (e.g., homeland security, paramilitary, law enforcement, correctional facilities, etc.).

In traditional TES training environments, Ground Based Air Defense (GBAD) plays little part in training. GBAD, which includes units trained in defending against aircraft such as unmanned aerial vehicles (UAVs) (including drones and drone swarms), helicopters, fixed-wing, and other aerial vehicles, either train against live targets on closed ranges (outside of a TES training environment) or play only a notional part in non-live fire ("dry") tactical training. Some countries, such as the United States, attempts have been made to instrument GBAD platforms to allow for more meaningful training environment, but through a technologically difficult/unrealistic system.

BRIEF SUMMARY

Embodiments disclosed herein address these and other issues by providing for an aerial vehicle enabled to interact within a TES environment, and capable of acting as a GBAD platform to represent virtually any type of aircraft in the simulation. The aerial vehicle may include sensors for determining its own location and/or orientation, and may further carry a payload of components that can be assembled modularly to equipped the aerial vehicle with different types of functionality. Such functionality can include enabling the aerial vehicle to gather information regarding its surroundings, engage with other military entities within the TES environment, and/or enable other military entities within the TES environment to engage with it.

An example aerial vehicle for use in a TES environment, according to the description, includes a body configured to lift a payload, and a communications unit comprising a Global Navigation Satellite System (GNSS) receiver, an inertial measurement unit (IMU), and a wireless communication interface. The communications unit is configured to obtain data from one or more components of the payload, and wirelessly send simulation information, via the wireless communication interface, to a computer server communicatively coupled with the TES environment. The simulation information based on the data received from the one or more components of the payload, the data from the GNSS receiver, and the data from the IMU.

Embodiments of the aerial vehicle may include one or more of the following features. The one or more components of the payload may comprise a laser detector, a laser transmitter, a thermal signature unit, an engagement indicator unit, a radar reflector, a camera, or any combination thereof. The one or more components of the payload may comprise the camera, and the communications unit may be further configured to include, in the simulation information, a video stream. The one or more components of the payload may comprise the laser detector, and the communications unit may be further configured to include, in the simulation information, an indication of a simulated engagement by an entity within the TES environment with the aerial vehicle. The one or more components of the payload may comprise the laser transmitter, and the communications unit may be further configured to include, in the simulation information, an indication of a simulated engagement by the aerial vehicle with an entity within the TES environment. The one or more components of the payload may be configured to be modularly engaged with the payload. The communications unit may be further configured to receive the data from the one or more components of the payload via the wireless communication interface. The wireless communication interface may be configured to send the simulation information via cellular radio frequency (RF) technology.

An example method of operating an aerial vehicle within a TES environment, according to the description, comprises obtaining, at the aerial vehicle, data from a GNSS receiver of the aerial vehicle, obtaining, at the aerial vehicle, data from an inertial measurement unit (IMU) of the aerial vehicle, obtaining, at the aerial vehicle, data from one or more components of a payload carried by the aerial vehicle; and wirelessly sending simulation information, via a wireless communication interface of the aerial vehicle, to a computer server communicatively coupled with the TES environment. The simulation information is based on the data from the one or more components of the payload, the data from the GNSS receiver, and the data from the IMU.

Embodiments of the method may include one or more of the following features. The one or more components of the payload comprise a laser detector, a laser transmitter, a thermal signature unit, an engagement indicator unit, a radar reflector, a camera, or any combination thereof. The one or more components of the payload may comprise the camera, and the method may further comprise including, in the simulation information, a video stream. The one or more components of the payload may comprise the laser detector, and the method may further comprises including, in the simulation information, an indication of a simulated engagement by an entity within the TES environment with the aerial vehicle. The one or more components of the payload may comprise the laser transmitter, and the method may further comprise including, in the simulation information, an indication of a simulated engagement by the aerial vehicle with an entity within the TES environment. The one or more components of the payload may be configured to be modularly engaged with the payload. Obtaining the data from the one or more components of the payload may comprise receiving the data from the one or more components of the payload via the wireless communication interface. The wireless communication interface may be configured to send the simulation information via cellular radio frequency (RF) technology.

An example non-transitory computer-readable medium, according to the description, has instructions embedded thereon for operating an aerial vehicle within a TES environment. The instructions, when executed by one or more processing units of the aerial vehicle, cause the one or more processing units to obtain, at the aerial vehicle, data from a GNSS receiver of the aerial vehicle, obtain, at the aerial vehicle, data from an inertial measurement unit (IMU) of the aerial vehicle, obtain, at the aerial vehicle, data from one or more components of a payload carried by the aerial vehicle, and wirelessly send simulation information, via a wireless communication interface of the aerial vehicle, to a computer server communicatively coupled with the TES environment. The simulation information is based on the data from the one or more components of the payload, the data from the GNSS receiver, and the data from the IMU.

The non-transitory computer-readable medium can include one or more of the following features. The instructions for causing the one or more processing units to obtain the data from one or more components of the payload carried by the aerial vehicle may further comprise instructions for causing the one or more processing units to obtain data from a laser detector, a laser transmitter, a thermal signature unit, an engagement indicator unit, a radar reflector, a camera, or any combination thereof. The instructions, when executed by the one or more processing units, may further cause the one or more processing units to include, in the simulation information, a video stream. The instructions, when executed by the one or more processing units, further cause the one or more processing units to include, in the simulation information, an indication of a simulated engagement by an entity within the TES environment with the aerial vehicle.

BRIEF DESCRIPTION OF THE DRAWINGS

For a more complete understanding of this invention, reference is now made to the following detailed description of the embodiments as illustrated in the accompanying drawings, in which like reference designations represent like features throughout the several views and wherein.

Figure 1:
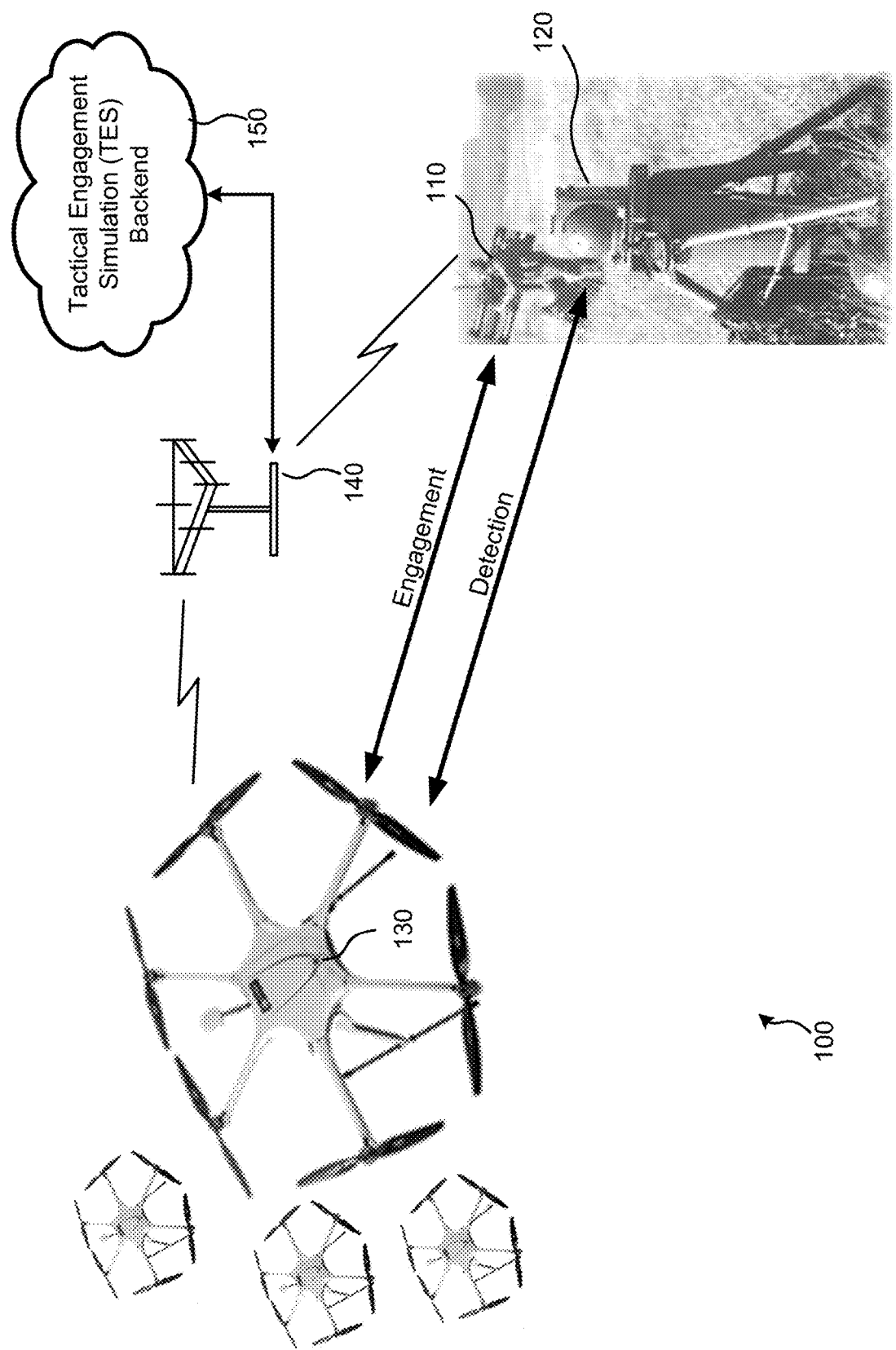
FIG. 1 is a simplified illustration of a TES environment, according to an embodiment.

In the appended figures, similar components and/or features may have the same reference label. Further, various components of the same type may be distinguished by following the reference label by a dash and a second label that distinguishes among the similar components. If only the first reference label is used in the specification, the description is applicable to any or all of the similar components having the same first reference label irrespective of the second reference label.

DETAILED DESCRIPTION

The ensuing description provides embodiments only, and is not intended to limit the scope, applicability or configuration of the disclosure. Rather, the ensuing description of the embodiments will provide those skilled in the art with an enabling description for implementing an embodiment. It is understood that various changes may be made in the function and arrangement of elements without departing from the scope.

Given current/future threats, particularly against UAVs, the ability of GBAD to train in a realistic manner is important; engagements are short/decision-making cycles tight. An affordable, technologically-simple, yet innovative method of bringing GBAD into force-on-force training is desirable.

Embodiments provided herein are directed toward a TES GBAD platform comprising an instrumented drone (or other aircraft) that can act as a visible target in a TES environment and/or engage with other entities within the TES environment. The TES GBAD platform may act as a target for "All Arms Air Defense" (in which all units, including infantry with small arms, may participate in air defense) and "Air Defense Artillery" (e.g., the GBAD, which may have specialized air defense weaponry), and the TES GBAD platform may further represent other aircraft not visible in the physical training environment. The TES GBAD platform may comprise a cellular radio (e.g., enabled with Long Term Evolution (LTE) and/or similar cellular communications), as well as computation technology (e.g., processing hardware and/or software) accurate inertial measurement devices (e.g., and inertial measurement unit (IMU)), and/or laser receivers. The TES GBAD platform may be suited to carry a modular payload equipped with different hardware suitable for different applications. Additional details are provided herein below.

It can be noted that, although embodiments provided herein describe a communications interface or unit using LTE or other cellular technology, other wireless technologies can be used in addition or as an alternative to LTE to communicate with a wide area network (WAN) or other digital communication network. These technologies can include, for example, fifth-generation (5G) New Radio (NR) or Nth Generation (NG) wireless standards and protocols. A person of ordinary skill in the art will appreciate that such standards evolve, and that new equivalent standards may take their place.

As an additional note, although described as being capable of engaging with and/or being engaged by ground-based or other entities within a TES environment, embodiments of the TES GBAD platform may represent a friendly aerial vehicle within a TES environment.

FIG. 1 is a simplified illustration of a TES environment 100, according to an embodiment. As discussed herein below, the TES environment 100 may be capable of providing training in a field exercise involving multiple types of entities, such as soldiers 110, artillery (and/or other weapons), vehicles, weapons and other equipment (such as thermal detector 120), buildings, etc. Rather than live ammunition, the TES environment 100 may be a "dry" training in which laser transmitters and/or other equipment is used to simulate the firing of weaponry. According to embodiments described herein, the TES environment 100 may also include one or more TES GBAD platforms 130. Moreover, the various entities in the TES environment 100 can communicate wirelessly via LTE (or similar wireless technology) to a base station 140, which can communicate between the various entities and a TES backend 150. In the TES environment 100, the training may use laser transmitters It can be noted that, to avoid clutter, FIG. 1 illustrates one soldier 110, one thermal detector 120, and a few TES GBAD platforms 130 (only one of which is labeled). However, a person of ordinary skill in the art will appreciate that some embodiments of a TES environment 100 may have any number of each entity type (including no entities of a certain type). For example, in a given training, the TES environment 100 may comprise dozens, hundreds, or even thousands (or more) of soldiers 110, thermal detectors 120, TES GBAD platforms 130 and/or other military entities that can populate a battlefield in a TES environment 100 (such as tanks, anti-aircraft units, light tactical vehicles, etc.). Moreover, embodiments additionally or alternatively may include any number of base stations 140.

In brief, each military entity 110, 120, and 130 may be provided with a military communications unit capable of communicating with the TES backend 150 via a base station 140. As previously noted, wireless communication may utilize a high-bandwidth digital communication standards, such as LTE or other cellular technologies, thereby giving the military communication system a very high throughput capacity, relative to traditional techniques. (In the case of LTE, the base station 140 would comprise a gNodeB (gNB).) Moreover, utilization of LTE or similar technologies can enable the TES environment to utilize non-line-of-sight systems.

The TES backend 150 may comprise one or more computer servers configured to gather information from the various entities within the TES environment 100 and provide information regarding the training in real-time and/or post hoc in After-Action Review (AAR). The information gathered from the various entities within the TES environment 100 may include, for example, status information (e.g., whether the entity is "killed" or "injured", location and/or orientation information, etc.), information specific to an entity type (e.g., remaining fuel/ammunition, whether a weapon or equipment is deployed/armed, etc.), engagement information (e.g., whether it has engaged and/or has been engaged by other entities), and the like. The information provided by the TES backend 150 may include any of a variety of analytics and/or visual simulations.

In some embodiments, for example, the TES backend may provide analytical information to simulation supervisors to determine whether individual entities performed as commanded, the effectiveness of overall strategies, how different entities may interact, and so forth. Again, this analytical information may be provided in real-time or post hoc.

In some embodiments, for example, the TES backend may provide a 3-D computer-simulated visualization of a "virtual" battlefield populated by 3-D visualizations of the various entities within the TES environment 100. As discussed in more detail below, where one or more TES GBAD platforms 130 are used to represent an aircraft, the computer simulated visualization of the virtual battlefield may include a visualization of the aircraft.

In some embodiments, entities within the TES environment 100 may be provided with a simulated visualization of the virtual battlefield in real time. That is, soldiers and/or other entities training in the TES environment 100 may be equipped with a display (e.g., capable of providing an augmented reality (AR), mixed reality (MR), virtual reality (VR), or a similar visualization) showing the visualization, which may be overlaid on the corresponding physical representation in the TES environment 100. A light vehicle representing a tank, for example, can be shown as a tank within the visualization provided to a soldier in the TES environment 100. That said, most soldiers and other participants within the TES environment 100 may not be provided with such visualizations, and therefore may need to rely on the physical counterparts within the TES environment 100.

As previously noted, traditional TES training environments provide little with regard to GBAD training. It can be difficult, for example, to bring in traditional aircraft (e.g., helicopters) due to expense, logistics in arranging the aircraft and the pilot, restrictions in peacetime flight patterns, and/or other factors. Moreover, the aircraft may not be equipped to engage in the TES environment (e.g., via Multiple Integrated Laser Engagement System (MILES) or similar system), and some lasers used in the TES environment may be dangerous for pilots. And although some TES systems are beginning to incorporate the use of drones, the functionality of such drones is highly limited, which again limits the effectiveness of GBAD training.

According to techniques described herein, a TES GBAD platform 130 may comprise a drone or similar aerial vehicle enabled to interact within a TES environment 100. As such, one or more TES GBAD platforms 130 may represent any type of aircraft in the simulation. For example, one or more TES GBAD platforms 130 may represent a helicopter in the training. Because the TES GBAD platform 130 is TES-enabled, it can communicate information to the TES backend 150, be detected by various equipment (e.g. thermal detector 120) within the TES environment 100, and/or engage with various entities (e.g., soldier 110). This enables a GBAD unit to participate actively in a TES environment 100.

With these features, embodiments of the TES GBAD platform 130 can provide a number of advantages, including one or more of the following. Embodiments may provide for collective training, in which GBAD units can be routinely involve and critically tested in force-on-force training. Embodiments further enable affordability and/or simulate the contemporary threat of drones and/or drone swarms. Moreover, this can be carried out while troops are deployed tactically. Embodiments further provide an eye-safe solution for aircraft simulation, where there is no need to use the correct laser filters ensure the safety of a pilot's eyes. Moreover, embodiments may further provide active engagement acknowledgments and information for AAR. Embodiments may additionally or alternatively provide information (e.g., by communicating directly to the TES backend 150 via the base station 140) for AAR of the GBAD engagement for squads using small arms and GBAD air defense artillery, further providing full engagement statistics, and may additionally or alternatively represent any type of aircraft in a corresponding computer-simulated environment. According to some embodiments, the TES GBAD platform 130 may additionally include a camera, which may be used to provide live streaming and/or video feedback during AAR.

Figure 2:
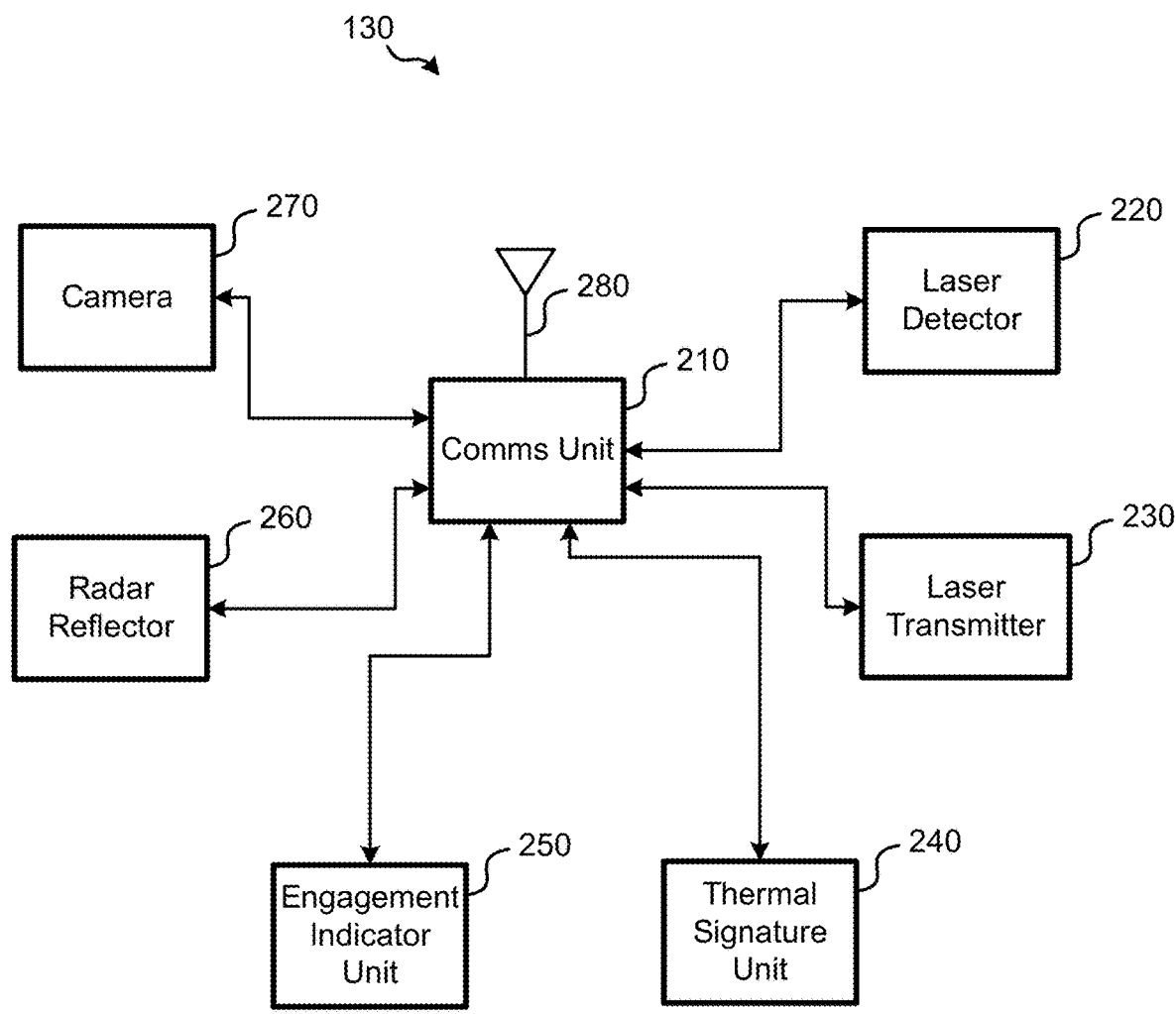
FIG. 2 is a block diagram of various electrical components of the TES GBAD platform, according to an embodiment.

FIG. 2 is a block diagram of various electrical components of the TES GBAD platform 130, according to an embodiment. (Various physical features, such as rotors, landing gear, etc. are not shown.) This figure helps illustrate the various types of components that may be included in the TES GBAD platform 130, according to embodiments. Here, the components include a communications ("comms") unit 210, laser detector 220, laser transmitter 230, thermal signature unit 240, engagement indicator unit 250, radar reflector 260, and camera 270. It can be noted that the components illustrated in FIG. 2 are provided as illustrative examples only. Embodiments may have additional or alternative components, may utilize any or all of the illustrated components or other types of components, and/or may utilize multiple components of the same type (e.g., multiple laser detectors 220), as needed in a TES environment 100.

Arrows illustrated in FIG. 2 represent communication and/or physical links between the various components. Communication links may use wireless and/or wired technologies. Wireless connections can include technologies such as Bluetooth®, Bluetooth Low Energy (BLE), Zigbee®, Wi-Fi®, near field communications (NFC), and/or other wireless technologies. To help ensure security communications, these wireless and/or wired communication links may use one or more types of encryption, which can be made to meet military-grade standards, if required.

According to embodiments, the laser detector 220 may comprise a MILES (or similar laser-based simulator) laser detector, or array of laser detectors (e.g., tuned to different types of laser transmitters and/or arrayed at different angles for a wide field of view) capable of receiving laser signals from simulated weapon firing within a TES environment 100. For example, a GBAD unit may engage the TES GBAD platform 130 in the TES environment 100 by aiming and firing a weapon at the TES GBAD platform 130. In the TES environment 100, the weapon may include a laser transmitter that simulates the firing of the weapon by email to a laser beam that illuminates the laser detector 220. The laser detector 220 can communicate detection of the laser beam (e.g., indicating the TES GBAD platform 130 has been engaged) to the TES backend 150, which may determine that the TES GBAD platform 130 has been "virtually" shot. According to some embodiments, various laser detectors 220 may be disposed at various locations on the TES GBAD platform 130, to help determine where the TES GBAD platform 130 was virtually shot, enabling for the determination of a status of the TES GBAD platform 130 (e.g., disabled, partially disabled, unaffected, etc.) for training purposes. In some embodiments, one or more laser detectors 220 may be configured to detect light from laser simulation systems (e.g., MILES) and/or light from laser systems used in combat.

In some embodiments, other components may be utilized to simulate other types of weapons. For instance, in some embodiments, the TES GBAD platform may be equipped with "simunitions" or other types of simulated air-to-land bombs, missiles, or other weaponry.

The laser transmitter 230 may enable the TES GBAD platform 130 to engage with other entities—on-ground and/or airborne—within the TES environment 100. Just as laser detector 220 may detect when the TES GBAD platform 130 is being engaged, the laser transmitter 230 may transmit laser light to illuminate a laser detector disposed on another entity, simulating engagement with that entity. Depending on desired functionality, the laser transmitter 230 may be configured to simulate different types of weaponry on an airborne vehicle.

The thermal signature unit 240 may be utilized by the TES GBAD platform 130 to provide a thermal signature to simulate the thermal signature of an aircraft the TES GBAD platform 130 is intended to represent. This can enable various types of equipment (e.g., thermal detector 120 of FIG. 1) to detect the TES GBAD platform 130 in a manner similar to the way in which it would detect the aircraft the TES GBAD platform 130 is intended to represent.

The engagement indicator unit 250 may provide audio and/or visual indications that the TES GBAD platform 130 is being engaged by and/or is engaging another entity. For instance, the engagement indicator unit 250 may a first set of lights to indicate the TES GBAD platform 130 is firing at an entity, and may utilize a second set of lights to indicate the TES GBAD platform 130 is being fired upon by an entity. In some embodiments, the first set and the second set of lights may be different colors to distinguish between when the TES GBAD platform 130 is engaging an entity from when it is being engaged by an entity. The engagement indicator unit 250 may additionally or alternatively utilize sound in a similar fashion, providing a first sound when the TES GBAD platform 130 is engaging an entity, and/or providing a second sound when the TES GBAD platform 130 is being engaged by an entity.

The radar reflector 260 may comprise one or more physical and/or electronic components configured to increase the likelihood of the TES GBAD platform 130 being detected by radar. Because the TES GBAD platform 130 may be relatively small in size, it may not be detected by some radar units. As such, and to help the TES GBAD platform 130 represent a different aircraft in a TES environment 100, the radar reflector 260 may help of the TES GBAD platform 130 appear on radar in a manner similar to the aircraft that the TES GBAD platform 130 represents.

The camera 270 may provide any of a variety of types of functions, depending on desired functionality. For example, the camera 270 may be used for surveillance, capturing still images and/or video and sending the images/video (via the core communications unit 210) to the TES backend 150 and/or another entity within the TES environment 110. Additionally or alternatively, images from the camera may be processed (either locally by the communications unit 210 or by a remote device communicatively coupled with the communications unit 210) for object identification and/or other image features to help determine situational awareness data. In some embodiments, the camera 270 may stream video and/or capture images in real time and/or store this data for AAR. In some embodiments, the images/video captured by the camera 270 may simulate images/video captured by a drone or other aircraft. In some embodiments, the images/video captured by the camera 270 may simply represent what would be viewable by the drone or other aircraft represented by the TES GBAD platform 130, which may be used in AAR training.

The communications unit 210 can provide computational (processing) functionality for the TES GBAD platform 130 and further enable communications between the TES GBAD platform 130 and the other entities within the TES environment 100. In some embodiments, the functionality of the communications unit 210 may be customized by executing different software applications. For example, the communications unit 210 may operate using the Android™ operating system, thereby being able to execute any of a variety of software programs (or "apps") executable for Android, which may include commercial and/or military applications. Some of these software programs may be customize for execution specifically by the communications unit 210. Other embodiments may utilize other types of operating systems, as desired. The communications unit 210 may communicate via an antenna 280 using any of a variety of radio frequency (RF) technologies, such as LTE or other cellular technologies. Depending on desired functionality, the communications unit 210 may provide the processing power and/or communications required to control (e.g., fly) the TES GBAD platform 130 autonomously and/or enable a user to control the TES GBAD platform 130 remotely.

As previously noted, communication between the communications unit 210 and other entities within the TES environment 100 (e.g., the TES backend 150) may pass through a Wide Area Network (WAN), such as a cellular network. The WAN may comprise one or more private and/or public networks, military and/or commercial providers, and may utilize any of a variety of wireless and/or wired technologies. Additional information regarding possible WAN types is provided below.

In some embodiments, the communications unit 210 may be incorporated into the body of the TES GBAD platform 130, while the other components may be included in a payload carried by the TES GBAD platform 130. Furthermore, according to some embodiments, the TES GBAD platform 130 may be configured to carry a modular payload, wherein different modules may be included in the payload, depending on the desired functionality of the TES GBAD platform 130. For example, where the TES GBAD platform 130 is intended to represent a helicopter, the radar reflector 260 and thermal signature unit 240 may be included in the payload of the TES GBAD platform 130, to help the TES GBAD platform 130 appear as a helicopter on radar and in thermal detection. Where the TES GBAD platform 130 is intended to represent a smaller, low-flying aircraft (e.g., a drone), the payload may include a laser detector 220 capable of receiving simulated fire from small arms (e.g., non-GBAD units) capable of engaging the smaller aircraft.

It will be understood that embodiments may include components not listed in FIG. 2. As a person of ordinary skill in the art will appreciate, the TES GBAD platform 130 may include components such as a power supply (e.g., a battery), electrical motors, flight and guidance systems, etc., to provide flight capabilities. These additional components may power and or may be communicatively coupled with one or more of the components illustrated in FIG. 2. moreover, additional components may enable the simulated use of RF jamming, RF-based weaponry, and/or other countermeasures against drones or other aerial vehicles; components enabling high-speed optical communication (in addition to or as an alternative to any communication provided by the laser detector 220 and/or laser transmitter 230); and/or other components.

Figure 3:
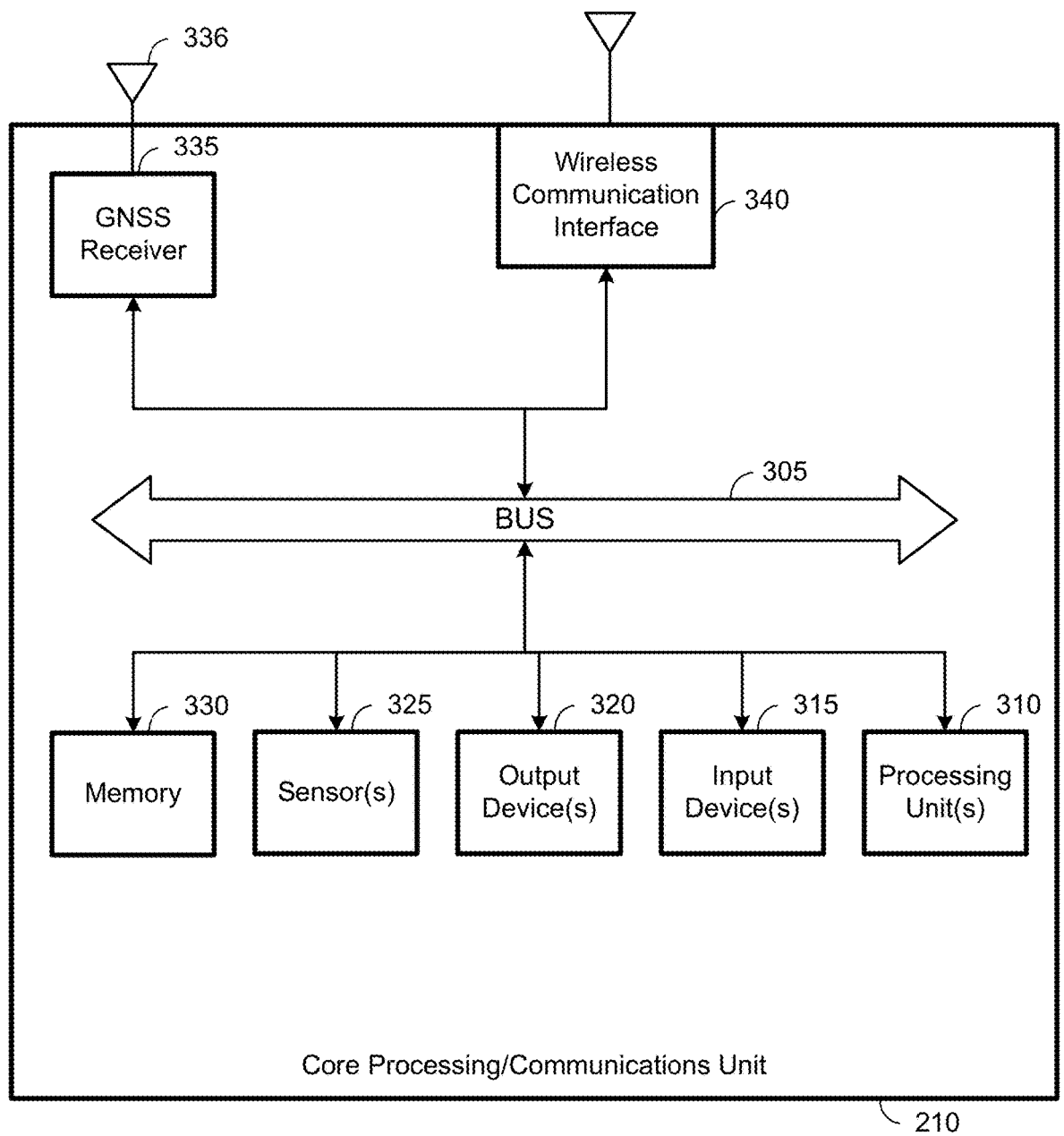
FIG. 3 is a simplified block diagram of the internal components of a communications unit of a TES GBAD platform, according to an embodiment.

FIG. 3 is a simplified block diagram of the internal components of a communications unit 210, according to an embodiment. As with other figures provided herein, it will be understood that alternative embodiments may comprise alternative configurations of the components, and may add, omit, combine, separate, and/or otherwise alter components, depending on desired functionality. The communications unit 210 may comprise a military design meeting military-grade standards, thereby configured to withstand higher levels of physical impacts, temperature extremes, and/or other environmental hazards than a consumer device. Nonetheless, a consumer-grade design and/or design met to meet other standards may be used if so desired. It will be understood that the communications unit 210 may comprise other electrical components (e.g., a battery or other power source) not illustrated in FIG. 3.

The various hardware components (components labeled 310-340) of the communications unit 210 can be electrically coupled via a bus 305 (or may otherwise be in communication, as appropriate). The hardware elements may include a memory 330. The hardware elements may include a processing unit(s) 310 which may comprise without limitation one or more general-purpose processors, one or more special-purpose processors (e.g., application specific integrated circuits (ASICs), and/or the like), reprogrammable circuitry, and/or other processing structure or means, which can be configured to cause the communications unit 210 to perform the functionality described herein. The communications unit 210 also may comprise one or more input devices 315, which may comprise without limitation one or more touch screens, touch pads, buttons, dials, switches, and/or the like; and one or more output devices 320, which may comprise without limitation, one or more displays, light emitting diode (LED)s, speakers, and/or the like. The input device(s) 315 and/or output device(s) 320 may provide, for example, a user interface enabling a user to alter settings and/or otherwise customize the functionality of the TES GBAD platform 130. (Alternatively, the communications unit 210 may communicate with a separate device (e.g., a smart phone, tablet, etc.) via the wireless communication interface 340 to provide a user interface.) In military applications, the input device(s) 315 and/or output device(s) 320 may be limited, in comparison with consumer devices such as smartphones. For example, in some embodiments, input device(s) 315 may be limited to a power switch and navigation buttons, and output device(s) 320 may be limited to a small, low power display. In some embodiments, the communications unit 210 may comprise a Universal Serial Bus (USB) port for data communication.

In some embodiments, the communications unit 210 may comprise one or more sensors 325. The sensor(s) 325 may comprise, for example, one or more accelerometers, gyroscopes, magnetometers, altimeters, proximity sensors, light sensors, and the like. In some embodiments, the sensor(s) 325 may comprise an inertial measurement unit (IMU). Sensor(s) 325 may be utilized, for example, to provide orientation and/or movement information regarding the TES GBAD platform 130. Additionally or alternatively, sensor(s) 325 may provide information for dead reckoning and/or other location determination techniques, which may be used to complement wireless positioning performed using data from Global Navigation Satellite System (GNSS) receiver 335 and/or wireless communication interface 340.

According to some embodiments, the communications unit 210 may comprise a GNSS receiver 335 capable of receiving signals from one or more GNSS satellites using a GNSS antenna 336, and determining a location of the TES GBAD platform 130. The GNSS receiver 335 may support measurement of signals from satellites of a GNSS system, such as Global Positioning System (GPS), Galileo, GLONASS, Quasi-Zenith Satellite System (QZSS), Indian Regional Navigational Satellite System (IRNSS) and/or other Satellite Positioning Systems (SPSes). Ultimately, the GNSS receiver 335 may determine a position of the TES GBAD platform 130 using any combination of one or more global and/or regional navigation satellite systems, augmentation systems, and/or other positioning/navigation systems.

The communications unit 210 may also include a wireless communication interface 340, which may comprise any number of hardware and/or software components for wireless communication. Such components may include, for example, a modem, a network card, an infrared communication device, a wireless communication device, and/or a chipset (e.g., components supporting Bluetooth, IEEE 802.11 (including Wi-Fi), IEEE 802.15.4 (including Zigbee), WiMAX™, cellular communication, etc.), and/or the like, which may enable the communications unit 210 to wirelessly communicate with the various components illustrated in FIG. 2 (which may be in the payload of the TES GBAD platform 130), and/or may enable the TES GBAD platform 130 to communicate with other entities within the TES environment 100. To enable this functionality, the wireless communication interface 340 may comprise various transceivers, and may communicate using commercial cellular and/or traditional military frequency bands, using one or more wireless RF technologies.

Figure 4:
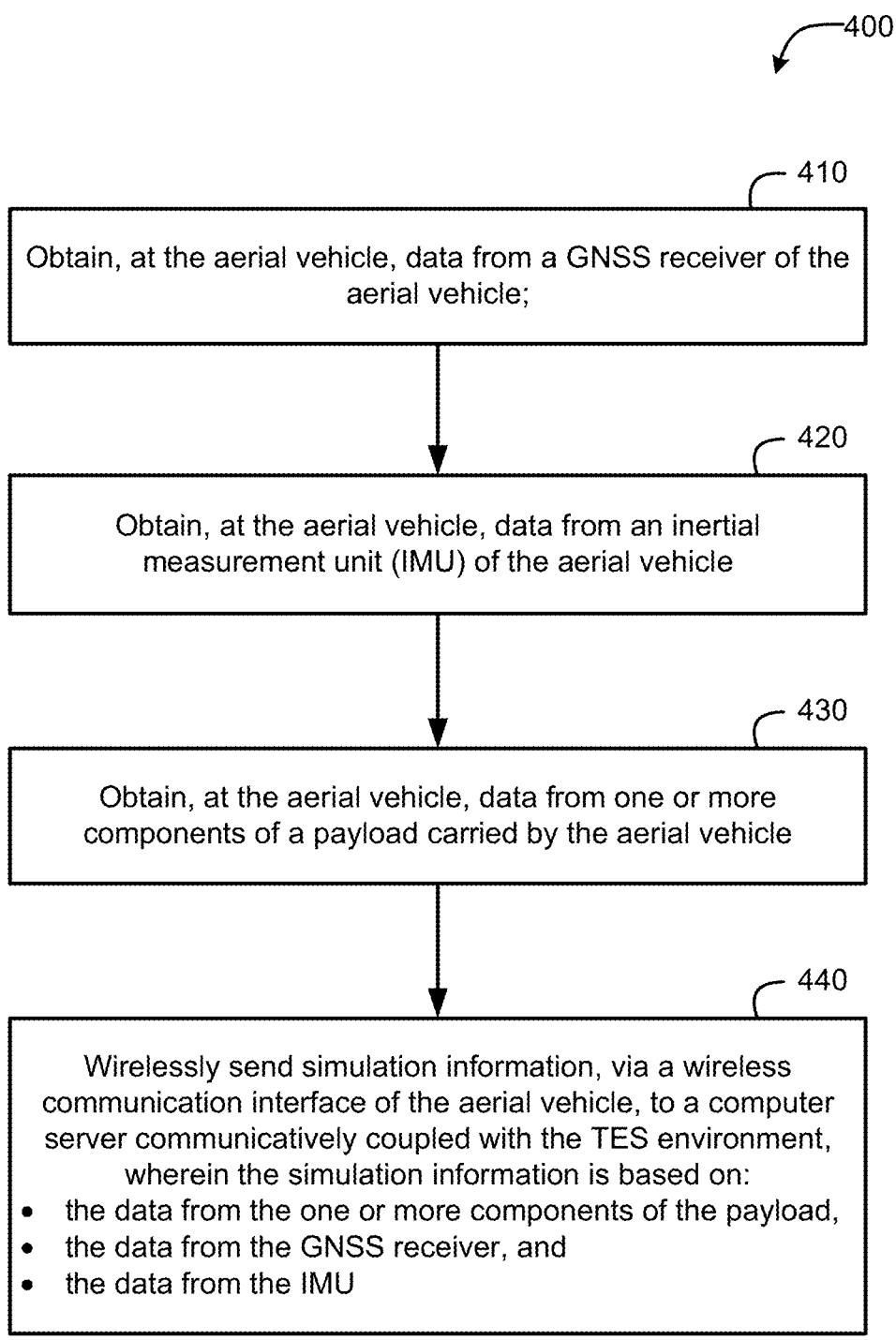
FIG. 4 is a flow diagram of a method of operating an aerial vehicle within a TES environment, according to an embodiment.

FIG. 4 is a flow diagram of a method 400 of operating an aerial vehicle within a TES environment, according to an embodiment, which can allow the aerial vehicle to operate as a TES GBAD platform, as described in the embodiments above. Alternative embodiments may vary in function by combining, separating, or otherwise varying the functionality described in the blocks illustrated in FIG. 4. Means for performing the functionality of one or more of the blocks illustrated in FIG. 4 may comprise one or more components of an aerial vehicle, such as components of a TES GBAD platform as illustrated in FIGS. 2 and 3. Such means may further include software means, which may be executed by one or more processing units (e.g., processing unit(s) 310 of FIG. 3).

At block 410, the method comprises obtaining, at the aerial vehicle, data from a GNSS receiver of the aerial vehicle. As illustrated in FIG. 3, the GNSS receiver may be part of a communications unit disposed on the aerial vehicle. That said, in some embodiments, the GNSS receiver a be separate from the communications unit, but may be communicatively connected thereto.

At block 420, the functionality comprises obtaining, at the aerial vehicle, data from an IMU of the aerial vehicle. Here again, the IMU may be part of a comms unit, or may be separate from the comms unit, but communicatively linked thereto. The IMU may comprise one or more sensors capable of determining motion and/or orientation of the aerial vehicle. That is, the IMU may comprise one or more gyroscopes, accelerometers, magnetometers, etc.

At block 430, the functionality of the method 400 comprises obtaining, at the aerial vehicle, data from one or more components of a payload carried by the aerial vehicle. Such functionality speaks to the modularity of the aerial vehicle, according to some embodiments, which may be capable of carrying any of a variety of types of payloads. As noted previously, these payloads may comprise a laser detector, a laser transmitter, a thermal signature unit, and engagement indicator unit, a radar reflector, a camera, or any combination thereof. In some embodiments, the one or more components of the payload are configured to be modular the engaged with the payload. Moreover, in some embodiments, obtaining the data from the one or more components of the payload comprises receiving the data from the one or more components of the payload via a wireless communication interface. Such functionality facilitate the aerial vehicles ability to provide modular functionality (e.g., by physically coupling with a payload, without the separate need for a wired communication connection). In some embodiments, therefore, where the aerial vehicle's physical engagement with the payload can be automated, the aerial vehicle may be able to both physically and communicatively couple and/or decouple with different payloads, which can make operation including—including a change in payload—fully or nearly-fully automated.

At block 440, the method comprises wirelessly sending simulation information, via a wireless communication interface of the aerial vehicle, to a computer server communicatively coupled with the TES environment, where the simulation information is based on the data from the one or more components of the payload, the data from the GNSS receiver, and the data from the IMU. As noted above, with information from the GNSS receiver, IMU, and one or more components in the payload, the aerial vehicle is able to provide a rich amount of simulation information that can include orientation and location of the aerial vehicle (e.g., six degrees of freedom, or 6DOF), as well as surrounding information, including information regarding any simulated engagement with other military entities in the TES environment. For example, where the one or more components of the payload comprise a camera, the simulation information can include a video stream. Additionally or alternatively, where the one or more components of the payload comprise a laser detector, the simulation information can include an indication of a simulated engagement by an entity within the TES environment with the aerial vehicle and/or a simulated engagement by the aerial vehicle with an entity within the TES environment. This simulation information can then be communicated to the TES backend, as previously discussed.

To do so, the aerial vehicle may send the simulation information via a cellular RF technology (e.g., LTE, 5G, etc.) using its comms unit.

Simulation information provided by the aerial vehicle can vary, depending on desired functionality. As noted above, simulation information may include, for example, status information (e.g., whether the aerial vehicle is "killed" or "injured", location and/or orientation information of the aerial vehicle, etc.), remaining fuel/ammunition, whether a weapon or equipment is deployed/armed, engagement information, and/or the like. In some embodiments, the simulation information may be formatted in accordance with a distributed computer simulation standard, such as Distributed Interactive Simulation (DIS) or High-Level Architecture (HLA). This formatting facilitate its use to TES backend in providing a simulated environment.

Various components may be described herein as being "configured" to perform various operations. Those skilled in the art will recognize that, depending on implementation, such configuration can be accomplished through design, setup, placement, interconnection, and/or programming of the particular components and that, again depending on implementation, a configured component might or might not be reconfigurable for a different operation. Moreover, for many functions described herein, specific means have also been described as being capable of performing such functions. It can be understood, however, that functionality is not limited to the means disclosed. A person of ordinary skill in the art will appreciate that alternative means for performing similar functions may additionally or alternatively be used to those means described herein.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that may comprise memory may comprise non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

What is claimed is:

1. An aerial vehicle for use in a Tactical Engagement Simulation (TES) environment, the aerial vehicle comprising:
   a body configured to lift a payload; and
   a communications unit comprising:
      a Global Navigation Satellite System (GNSS) receiver,
      an inertial measurement unit (IMU), and
      a wireless communication interface;
   wherein the communications unit is configured to
      obtain data from one or more components of the payload, and
      wirelessly send simulation information, via the wireless communication interface, to a computer server communicatively coupled with the TES environment, wherein:
         the simulation information includes engagement information comprising:
            an indication of a simulated engagement by the aerial vehicle with an entity within the TES environment,
            an indication of a simulated engagement by an entity within the TES environment with the aerial vehicle, or
            both; and
         the simulation information is based on:
            the data received from the one or more components of the payload,
            the data from the GNSS receiver, and
            the data from the IMU.

2. The aerial vehicle of claim 1, wherein the one or more components of the payload comprise:
   a laser detector,
   a laser transmitter,
   a thermal signature unit,
   an engagement indicator unit,
   a radar reflector,
   a camera, or
   any combination thereof.

3. The aerial vehicle of claim 2, wherein the one or more components of the payload comprise the camera, and the communications unit is further configured to include, in the simulation information, a video stream.

4. The aerial vehicle of claim 2, wherein the one or more components of the payload comprise the laser detector.

5. The aerial vehicle of claim 2, wherein the one or more components of the payload comprise the laser transmitter.

6. The aerial vehicle of claim 1, wherein the one or more components of the payload are configured to be modularly engaged with the payload.

7. The aerial vehicle of claim 1, wherein the communications unit is further configured to receive the data from the one or more components of the payload via the wireless communication interface.

8. The aerial vehicle of claim 1, wherein the wireless communication interface is configured to send the simulation information via cellular radio frequency (RF) technology.

9. A method of operating an aerial vehicle within a Tactical Engagement Simulation (TES) environment, the method comprising:
   obtaining, at the aerial vehicle, data from a GNSS receiver of the aerial vehicle;
   obtaining, at the aerial vehicle, data from an inertial measurement unit (IMU) of the aerial vehicle;
   obtaining, at the aerial vehicle, data from one or more components of a payload carried by the aerial vehicle; and
   wirelessly sending simulation information, via a wireless communication interface of the aerial vehicle, to a computer server communicatively coupled with the TES environment, wherein:
      the simulation information includes engagement information comprising:
         an indication of a simulated engagement by the aerial vehicle with an entity within the TES environment,
         an indication of a simulated engagement by an entity within the TES environment with the aerial vehicle, or
         both; and
      the simulation information is based on:
         the data from the one or more components of the payload,
         the data from the GNSS receiver, and
         the data from the IMU.

10. The method of claim 9, wherein the one or more components of the payload comprise:
    a laser detector,
    a laser transmitter,
    a thermal signature unit,
    an engagement indicator unit,
    a radar reflector, a camera, or any combination thereof.

11. The method of claim 10, wherein the one or more components of the payload comprise the camera, and wherein the method further comprises including, in the simulation information, a video stream.

12. The method of claim 10, wherein the one or more components of the payload comprise the laser detector.

13. The method of claim 10, wherein the one or more components of the payload comprise the laser transmitter.

14. The method of claim 9, wherein the one or more components of the payload are configured to be modularly engaged with the payload.

15. The method of claim 9, wherein obtaining the data from the one or more components of the payload comprises receiving the data from the one or more components of the payload via the wireless communication interface.

16. The method of claim 9, wherein the wireless communication interface is configured to send the simulation information via cellular radio frequency (RF) technology.

17. A non-transitory computer-readable medium having instructions embedded thereon for operating an aerial vehicle within a Tactical Engagement Simulation (TES) environment, wherein the instructions, when executed by one or more processing units of the aerial vehicle, cause the one or more processing units to:

obtain, at the aerial vehicle, data from a GNSS receiver of the aerial vehicle;

obtain, at the aerial vehicle, data from an inertial measurement unit (IMU) of the aerial vehicle;

obtain, at the aerial vehicle, data from one or more components of a payload carried by the aerial vehicle; and wirelessly send simulation information, via a wireless communication interface of the aerial vehicle, to a computer server communicatively coupled with the TES environment, wherein:

the simulation information includes engagement information comprising:

an indication of a simulated engagement by the aerial vehicle with an entity within the TES environment, an indication of a simulated engagement by an entity within the TES environment with the aerial vehicle, or both; and the simulation information is based on:

the data from the one or more components of the payload, the data from the GNSS receiver, and the data from the IMU.

18. The non-transitory computer-readable medium of claim 17, wherein the instructions for causing the one or more processing units to obtain the data from one or more components of the payload carried by the aerial vehicle further comprise instructions for causing the one or more processing units to obtain data from:

a laser detector, a laser transmitter, a thermal signature unit, an engagement indicator unit, a radar reflector, a camera, or any combination thereof.

19. The non-transitory computer-readable of claim 18, wherein the instructions, when executed by the one or more processing units, further cause the one or more processing units to include, in the simulation information, a video stream.

20. The non-transitory computer-readable of claim 18, wherein the instructions, when executed by the one or more processing units.

* * * * *